Figure 1:
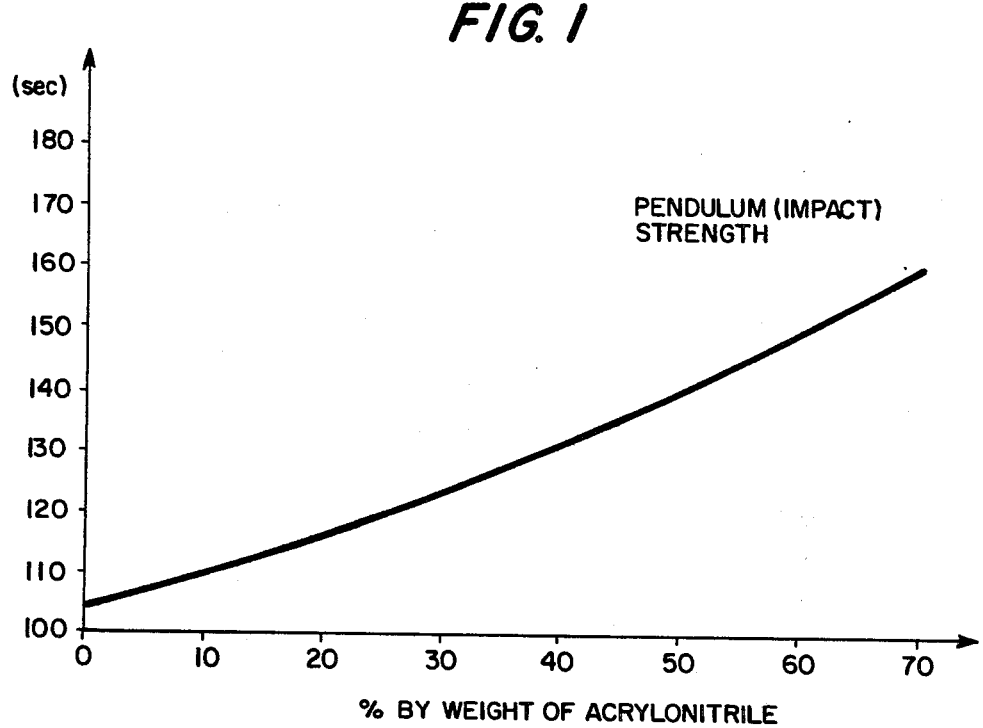
Figure 1:
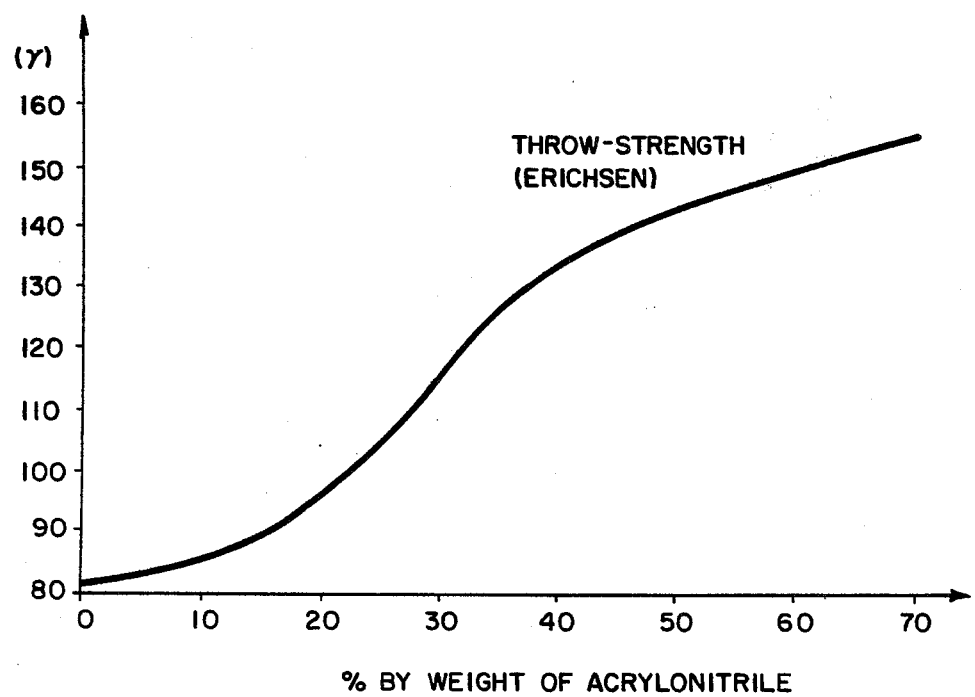
Figure 2:
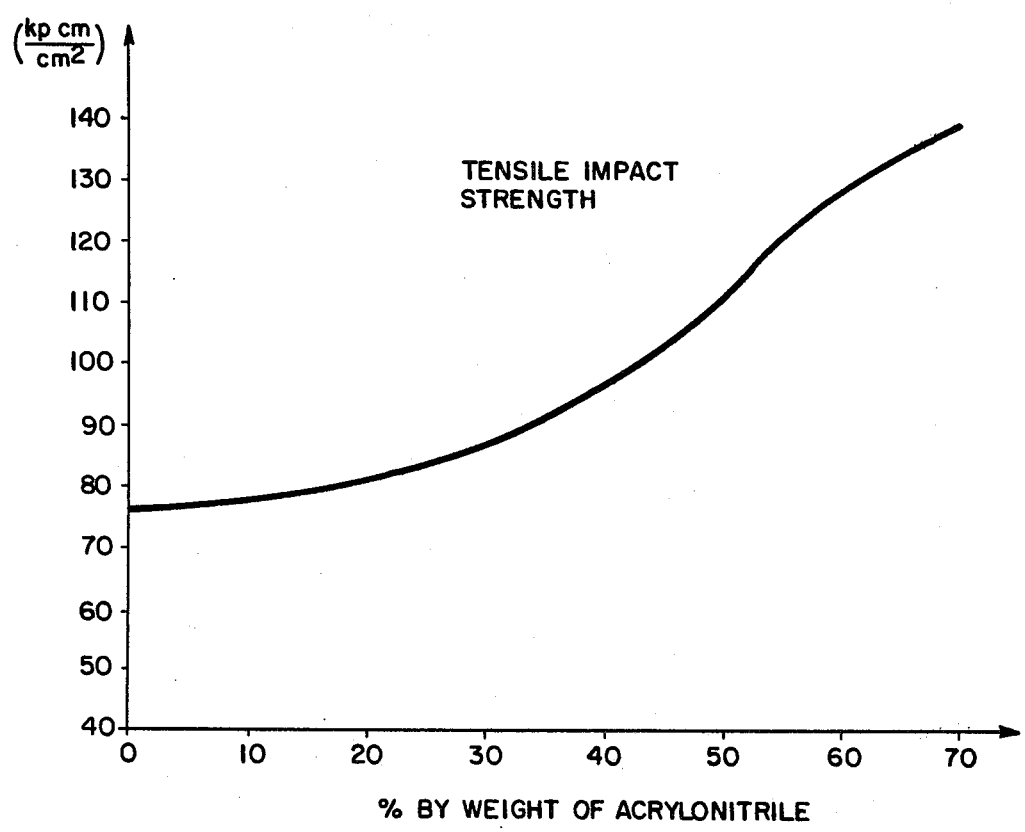
Figure 3:
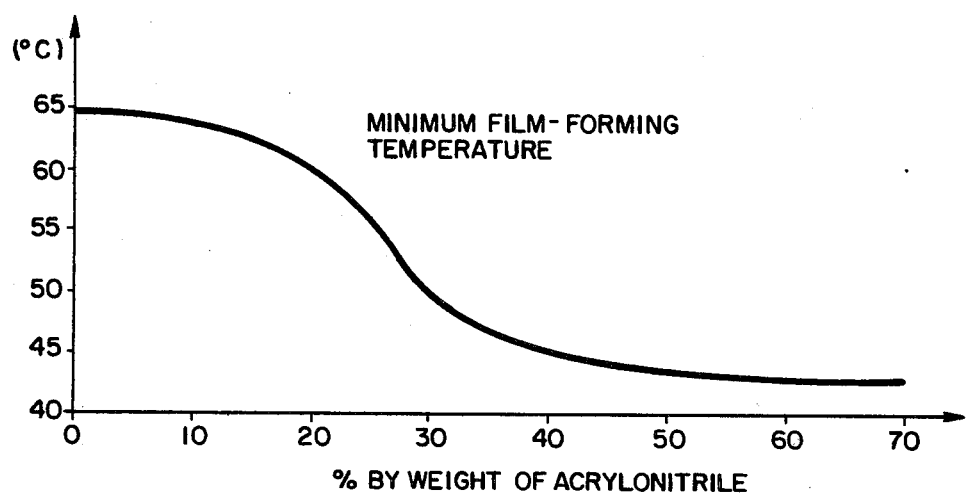
Figure 3:
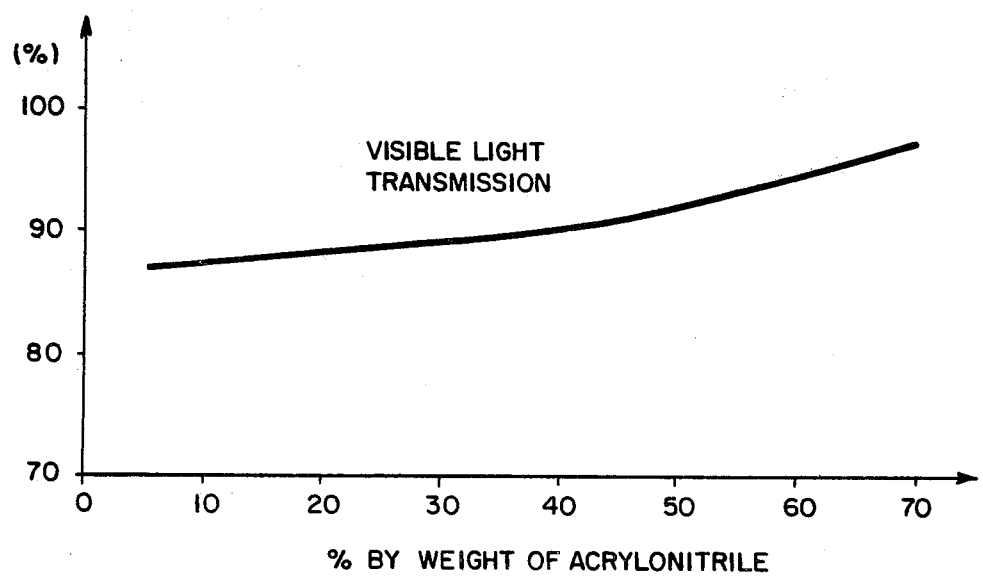

United States Patent [19]

Fock et al.

[11] 4,138,450

[45] Feb. 6, 1979

[54] COPOLYMERIZATE FOIL SUITABLE FOR SURFACE FINISHING

[75] Inventors: Jürgen Fock, Düsseldorf; Eckehard Schamberg, Essen-Kupferdreh; Wolfgang Hoffmann, Essen, all of Fed. Rep. of Germany

[73] Assignee: Th. Goldschmidt AG, Fed. Rep. of Germany

[21] Appl. No.: 815,235

[22] Filed: Jul. 13, 1977

[30] Foreign Application Priority Data

Jul. 13, 1976 [DE] Fed. Rep. of Germany ....... 2631423

[51] Int. Cl.$^2$ ............................................. C08L 33/20
[52] U.S. Cl. .......................... 260/881; 260/29.6 RW; 260/851; 260/855; 428/510
[58] Field of Search ..................................... 260/881

[56] References Cited

FOREIGN PATENT DOCUMENTS 2212928  3/1972  Fed. Rep. of Germany.

*Primary Examiner*—Carman J. Seccuro
*Attorney, Agent, or Firm*—James E. Bryan

[57] ABSTRACT

This invention relates to a copolymerizate foil suitable for surface finishing, and which may be thermosetting, composed of:

(A) an elastomeric copolymerizate with a glass transition temperature no higher than +10° C., obtained by copolymerizing
  (a) 70 to 99% by weight of an acrylic acid alkyl ester with 1 to 8 carbon atoms in the alkyl residue,
  (b) 1 to 20% by weight of at least one of a hydroxyalkyl ester with 2 to 4 carbon atoms in the alkyl residue, and an acid amide of acrylic or methacrylic acid,
  (c) 0 to 20% by weight of at least one of acrylonitrile and methacrylonitrile, and optionally
  (d) 0 to 2% by weight of a cross-linking monomer with at least two reactive, non-conjugated double bonds in the molecule, the reactivity of the double bonds possibly varying, where the sum of a, b, c, and d amounts to 100% by weight, acting as the grafting base, onto which is grafted (B) a hard-brittle copolymerizate obtained by copolymerizing
  (a) 10 to 60% by weight of at least one of styrene and one or more methacrylic acid alkyl esters with 1 to 20 carbon atoms in the alkyl residue,
  (b) 1 to 10% by weight of an acrylic acid alkyl ester with 1 to 8 carbon atoms in the alkyl residue,
  (c) 0 to 20% by weight of an N-methoxymethyl amide of at least one of acrylic acid and methacrylic acid,
  (d) 0 to 20% by weight of a hydroxyalkyl ester of acrylic or methacrylic acid with 2 to 4 carbon atoms in the alkyl residue,
  (e) 0 to 20% by weight of acrylic or methacrylic acid amide, the molar ratio of component c to the sum of d and e being about 1 : 1 and that of d : e ranging from 4 : 1 to 1 : 4, and optionally
  (f) >20 to 75% by weight of at least one of acrylonitrile and methacrylonitrile, where the sum of components a through f is 100% by weight and where the ratio by weight of the elastomeric copolymerizate A to the hard-brittle copolymerizate B is 1 : 3 to 1 : 20.

2 Claims, 3 Drawing Figures

COPOLYMERIZATE FOIL SUITABLE FOR SURFACE FINISHING

German Patent No. 2,212,928 discloses a thermosetting, long shelf-life foil which in the hardened state is impact-resistant, and which is composed of:

(A) an elastomeric copolymerizate with a glass transition temperature of not more than + 10° C., obtained by copolymerizing
  (a) 70 to 99% by weight of an acrylic acid alkyl ester with 1 to 8 carbon atoms in the alkyl residue,
  (b) 1 to 20% by weight of a hydroxy alkyl ester with 2 to 4 carbon atoms in the alkyl residue and/or an acid amide of acrylic or methacrylic acid, and possibly
  (c) 0 to 2% by weight of a cross-linking monomer with at least two reactive non-conjugated double bonds in the molecule, the reactivity of the double bonds possibly varying, where the sum of (a), (b) and (c) must be 100% by weight, and where the copolymerizate is the base for grafting, upon which is grafted (B) a hard-brittle copolymerizate obtained by copolymerizing
  (a) 60 to 80% by weight of styrene and/or a methacrylic acid alkyl ester with 1 to 20 carbon atoms in the alkyl residue,
  (b) 1 to 20% by weight of an acrylic acid alkyl ester with 1 to 8 carbon atoms in the alkyl residue,
  (c) 1 to 20% by weight of an N-methoxy methylamide of acrylic and/or methacrylic acid,
  (d) 1 to 20% by weight of a hydroxy alkyl ester of acrylic or methacrylic acid with 2 to 4 carbon atoms in the alkyl residue,
  (e) 1 to 20% by weight of acrylic or methacrylic acid, the molar ratio of component c to the sum of d and e being about 1 : 1 and the ratio of d : e being from 4 : 1 to 1 : 4, and possibly,
  (f) 0 to 20% by weight of acrylonitrile, where the sum of components a through f must be 100% by weight, and where the ratio by weight of the elastomeric copolymerizate A to the hard-brittle copolymerizate B is 1 : 3 to 1 : 20.

This patent teaches making the foil in such manner that first the monomers forming the elastomeric copolymerizate A are polymerized in solution, whereupon the monomers forming the hard-brittle copolymerizate B are added to the solution or emulsion of copolymerizate A and are polymerized therein, whereupon possibly softeners, pigments and/or condensation resins are added to the solution, the desired foil being prepared in known manner by evaporating the solvent from the above substance.

This foil can be pressed onto the surfaces of materials, in particular wooden plates, under pressure and with heat, and upon hardening forms an impact-resistant, weather-fast surface.

This foil has been found to be practical. However, its manufacture is rather costly because it is poured from an organic solution. Making the foil directly from a dispersion was found to be quite difficult because of the lack of film-forming properties. On that account example 8 of the above patent does show the preparation of an emulsified copolymerizate which then, however, is made to precipitate and to dissolve in an organic solvent to obtain the foil.

The present invention addresses the task of so changing the composition of the foil, while retaining or improving its properties, as to make the preparation thereof possible from an aqueous solution.

Surprisingly, it was found that this is feasible provided a substantial amount of acrylonitrile and/or methacrylonitrile is polymerized into the hard-brittle phase, again acrylonitrile and/or methacrylonitrile being polymerized, if appropriate, into the elastomeric copolymerizate.

The object of the present invention therefore is a copolymerizate foil suitable for surface finishing, and possibly also thermosetting, composed of:

(A) an elastomeric copolymerizate with a glass transition temperature of not more than + 10° C., obtained by the copolymerization of
  (a) 70 to 99% by weight of an acrylic acid alkyl ester with 1 to 8 carbon atoms in the alkyl residue,
  (b) 1 to 20% by weight of a hydroxyalkyl ester with 2 to 4 carbon atoms in the alkyl residue and/or an acid amide of acrylic or methacrylic acid,
  (c) 0 to 20% by weight of acrylonitrile and/or methacrylonitrile, and possibly,
  (d) 0 to 2% by weight of a cross-linking monomer with at least two reactive non-conjugated double bonds in the molecule, the reactivity of the double bonds possibly varying, where the sum of a, b, c, and d must be 100% by weight, and where the elastomeric copolymerizate is the base for grafting, onto which is grafted (B) a hard-brittle copolymerizate, obtained by copolymerizing
  (a) 10 to 60% by weight of styrene and/or one or more methacrylic acid alkyl esters with 1 to 20 carbon atoms in the alkyl residue,
  (b) 1 to 10% by weight of an acrylic acid alkyl ester with 1 to 8 carbon atoms in the alkyl residue,
  (c) 0 to 20% by weight of an N-methoxymethylamide of acrylic and/or methacrylic acid,
  (d) 0 to 20% by weight of a hydroxyalkylester of acrylic or methacrylic acid with 2 to 4 carbon atoms in the alkyl residue,
  (e) 0 to 20% by weight of acrylic or methacrylic acid amide, the molar ratio of component c to the sum of d and e being about 1 : 1 and the ratio of d : e being from 4 : 1 to 1 : 4, and possibly,
  (f) >20 to 75% by weight of acrylonitrile and/or methacrylonitrile, where the sum of components a through f amounts to 100% by weight, and where the ratio by weight of elastomeric copolymerizate A to hard-brittle copolymerizate B is 1 : 3 to 1 : 20.

The increased proportions of acrylonitrile and/or methacrylonitrile make it possible with respect to hardness and solvent-resistance to dispense entirely, if desirable, with the monomers used for hardening, i.e., there is no absolute necessity that the monomer mixture used for the preparation of the hard-brittle copolymerizate contain an N-methoxymethyl amide of acrylic and/or methacrylic acid, a hydroxyalkyl ester of acrylic or methacrylic acid with 2 to 4 carbon atoms in the alkyl residue, or the amide of acrylic or methacrylic acid.

In the preferred process of the invention for making the foil, therefore, first the monomers forming the elastomeric copolymerizate A are polymerized in the form of an emulsion or a suspension, whereupon the monomers forming the hard-brittle copolymerizate B are added to the dispersion of copolymerizate A and in turn are polymerized in the form of an emulsion or suspension, if appropriate, up to 10% by weight, based on the copolymerizate, means assisting film formation are added, and a foil is made in known manner by pouring the dispersion on a substrate and evaporating the water.

The emulsion or suspension polymerization is carried out in known manner in the presence of suitable emulsifiers, buffering materials and redox systems.

Suitable emulsifiers, among others, are sodium lauryl sulfate, sodium dodecyldiphenyl sulfonate, polyethylene glycol isooctylphenyl ether, sodium alkylaryl polyether sulfonate, tetrasodium-N-1-(1-2-dicarboxyethyl)-N-octadecyl sulfosuccinate, polyethylene glycol nonylphenyl ether, and polyethylene glycol tridecyl alcohol ether.

Suitable buffers may be sodium acetate, sodium hydrogen phosphate or sodium oxalate.

Suitable redox systems preferably are peroxides and hydroperoxides in combination with iron (II) salts, ascorbic acid, formamidine sulfinic acid or sodium formaldehyde sulfoxylate. The divalent iron also may be used in the form of the ethylene diamine tetraacetic acid complex. A particularly appropriate peroxide is cumyl hydroperoxide. In case of suspension polymerization, such azo initiators as azodiisobutyric acid nitrile may be used.

The ratio by weight of water to monomers in the dispersion as a rule ranges from 0.2 : 1 to 1 : 5.

Means facilitating film formation and which may be added to the dispersion, among others, are for instance methyl-, ethyl- or butyldiglycolacetate, methyl-, ethyl- or butyldiglycol, ethyl glycol, and diethylene or triethylene glycol.

Furthermore, solutions or emulsions especially of etherified aminoplastic resins, in amounts of up to 20% by weight based upon the solid resin, may be added to the dispersion. Especially preferred are etherified melamine-formaldehyde resins.

These melamine-formaldehyde resins should be precondensed and in the so-called B-state. Preferably lower alcohols, especially butanol, are used for etherifying these melamine-formaldehyde resins. Due to this addition, the foil will offer better flow properties and better adhesion when being pressed onto the surface being finished. Additionally, the solvent resistance of the hardened foil is also increased. This function also may be performed by possibly etherified methylolmelamines such as the methoxymethylmelamines.

The dispersion may be poured onto arbitrary, suitable substrate materials to form foils. On the other hand, it may remain until treatment, possibly also in condition for use, on the substrate. If a paper web is used as the subsrate, it may be previously soaked with aminoplastic resins or phenol plastic resins. This foil then may be processed for surface finishing jointly with the substrate film. Again, the foil may be produced on a substrate web impregnated with a mixture of acrylic resin dispersions and amino plastic resins.

It was surprising that the dispersion of a copolymerizate of the composition of the invention when poured on a substrate web and after evaporation of the water should form a pore-free foil.

A particular advantage is obtained in this respect, namely that the stressed foils offer greater resistance to kinking, better deep-drawing properties, decreased susceptibility to white fracturing and higher impact strength in the absence of the further addition of softening agents which had to be preferentially utilized in conformity with the state of the art as exemplified by German Pat. No. 2,212,928. The elimination of the softening agents however induces an appreciable increase in foil hardness. Surprisingly, the temperature of film formation is simultaneously decreased.

The foil of the invention adheres extraordinarily well to the substrate to be covered, and it also forms an excellent bond with additional adhesives. Consonant with this improved adhesion, the printing qualities of the foil also are improved.

On the whole, therefore, both the foil manufacture and the application properties thereof have been improved.

The manufacture of the foil of the invention and its properties will be further illustrated in the following examples.

EXAMPLE 1

(a) Manufacture and testing of a graft-copolymerizate containing an n-butylacrylate (A) and (B) an acrylonitrile, methylmethacrylate, n-butylmethacrylate, n-butylacrylate:

1st stage:

2.2 parts by weight of sodium lauryl sulfate; 0.014 part by weight of potassium peroxide disulfate and a monomer mixture of 58.7 parts by weight of n-butylacrylate, 5.1 parts by weight of acrylonitrile, 7.2 parts by weight of hydroxyethyl methacrylate, and 0.35 part by weight of allylmethacrylate are emulsified in 219 parts by weight of oxygen-free water. The temperature is kept constant during a 5-hour polymerization at 80° C.; stirring takes place under nitrogen. This is followed by cooling and a sample is taken to determine the degree of conversion. The yield is 99% of theoretical.

2nd stage:

To 83.3 parts by weight of the dispersion obtained from the 1st stage are added 266.4 parts by weight of distilled, oxygen-free water, 3.96 parts by weight of polyethyleneoxide alkylaryl ether, 1.98 parts by weight of sorbitane mono-oleate, 0.66 part by weight of polyethylene oxide sorbitane mono-oleate, 0.08 part by weight of potassium peroxide disulfate, and half of a monomer mixture composed of 47.8 parts by weight of acrylonitrile, 96.4 parts by weight of methylmethacrylate, 20.6 parts by weight of n-butylmethacrylate, 17.8 parts by weight of n-butylacrylate, 12 parts by weight of methoxymethyl-acrylamide, 6 parts by weight of hydroxyethylmethacrylate, and 4.2 parts by weight of acrylamide. Stirring takes place under nitrogen at 80° C. After half an hour, the second half of the monomer mixture is added in the course of one hour. The reaction is complete after three hours, and the conversion is 99% of theoretical.

(b) Making a foil from the graft copolymerizate:

100 parts by weight of the dispersion obtained per (a) are reacted with an emulsion composed of 5 parts by weight of water, 4 parts by weight of butyl diglycol acetate, 0.4 part by weight of stearylamide, 0.01 part by weight of polyethyleneoxide monomethylether, 0.04 part by weight of polyethylene oxide triglyceride and 0.8 part by weight of polyacrylamide, and the dispersion so modified is poured on a polyester sheet at 70 to 130° C. to form a 50 micron foil.

(c) Testing the copolymerizate foil:

A foil pressed onto an ornamental wood veneer at 145° C. and a pressure of 15 kp/cm$^2$ for 10 minutes is transparent and adheres well; there is no stress crack corrosion when subjected to methanol or ethanol-water mixtures. The hardened foil resists diluted acids and lyes, ethanol and gasoline. Acetone and ethylacetate upon brief exposure attack it only slightly; methylene chloride and trichloroethylene cause some swelling but fail to loosen it.

A 35% solution of a copolymerizate composed of 70 parts by weight of acrylonitrile, 120 parts by weight of ethylacrylate, 17.2 parts by weight of acrylic acid, 15.4 parts by weight of methoxymethyl methacrylamide in methylene chloride is so poured on the foil according to 1b above that a layer 40 microns thick is obtained following evaporation of the solvent at 50° C. The compound foil so obtained is pressed at a pressure of 20 kp/cm² for 3 minutes at 165° C. onto a carefully degreased and bonderized, galvanized sheet metal. The coated sheet metal is subjected to the following tests:

Dew-point climate with an atmosphere containing SO₂ (DIN 50018 Kesternich test): evaluation after 46 cycles: loss in gloss from original: 85% to 50%, surface otherwise wholly intact; no significant sub-creep in a cross-cut.

Salt-spray mist test per DIN 50021: no findings following 1,000 hours.

Dew-point water test per DIN 50017: no findings after 1,000 hours.

Erichsen cupping per DIN 53156: >10 mm.

Bending test: T = 1½, flawless, no formation of haircracks, very minor while fracture. Small-cup tests: flawless, very minor white fracture, following exposure of coated cup at 90° C. for 1 hour; the foil does not loosen at the edges.

Koenig pendulum (impact) hardness per DIN 53157 (cross-linked): 122 seconds.

| | |
|---|---|
| Throw-resistance (cross-linked) per Oesterle Type 435: | 95 p |
| Least temperature of film formation: | 55° C. |
| Impact tensile strength (cross-linked): | 82 kpcm/cm² |
| Visible light transmission: | 89% |

EXAMPLE 2

The procedure is the same as in Example 1a above, except for the stepwise increase in acrylonitrile content as indicated in the table below, the other proportions of bifunctional monomers however remaining constant.

| Acrylonitrile in % | Acrylonitrile | Parts by Weight Methylmethacrylate | Butylmethacrylate | Butylacrylate |
|---|---|---|---|---|
| 30 | 60 | 84.2 | 18.0 | 15.5 |
| 40 | 80 | 69.7 | 14.9 | 12.9 |
| 50 | 100 | 55.5 | 11.9 | 10.2 |
| 60 | 120 | 41.2 | 8.8 | 7.6 |
| 70 | 140 | 26.9 | 5.8 | 4.9 |

Modification of the dispersion and foil manufacture by pouring take place as in Example 1b.

The accompanying graphs show various properties relating to applications as a function of the acrylonitrile concentration. They clearly show that as the acrylonitrile content rises, pendulum strength and throw-resistance, as well as impact tensile strength and transmission increase, while the minimum film-forming temperature surprisingly drops. This is particularly clear for acrylonitrile contents exceeding 20% by weight. Furthermore, the tendency to white fractures progressively decreases as the acrylonitrile content increases.

EXAMPLE 3

(a) Preparing a graft copolymerizate containing (A) n-butylacrylate, acrylonitrile, and (B) styrene, methacrylonitrile, n-butylmethacrylate, and n-butylacrylate.

The procedure is the same as in Example 1a, except that the monomer mixture of the 2nd stage is composed of 50 parts by weight of methacrylonitrile, 64.2 parts by weight of styrene, 18 parts by weight of n-butylmethacrylate, 15.5 parts by weight of n-butylacrylate, 12 parts by weight of methoxymethyl methacrylamide, 6 parts by weight of hydroxyethylmethacrylate and 4.2 parts by weight of acrylamide. Further, in lieu of 0.08 part by weight of potassium peroxide disulfate, 1.5 parts by weight of azodiisobutyric acid nitrile are used.

(b) Modifying and pigmenting the dispersion obtained.

The modification of the dispersion obtained is effected as in Example 1b, except that the same amount of butyl diglycol replaces the butyl diglycol acetate. Pigmentation is effected by adding a paste obtained by mixing 40 parts by weight of titanium dioxide, 2.5 parts by weight of polyacrylamide and 10 parts by weight of water. A foil 75 microns thick is prepared as indicated above.

(c) Testing the foil obtained per 3b.

The tensile impact strength and hardness of a foil from 3b is 138 kpcm/cm² and 118 sec. respectively in the unhardened state and 129 kpcm/cm² and 125 sec. respectively in the hardened state. A foil pressed at 145° C. and a pressure of 17 kp/cm² for 8 minutes onto a phenol resin laminate adheres well and shows very good opacity; there is no stress-crack corrosion when subjected to mixtures of methanol-water or ethanol-water. The hardened foil resists diluted lyes and acids, ethanol and gasoline. Acetone and ethylacetate fail to attack it following brief exposure, while methylene chloride and trichloroethylene swell the foil somewhat, but fail to detach it.

It will be obvious to those skilled in the art that many modifications may be made within the scope of the present invention without departing from the spirit thereof, and the invention includes all such modifications.

What is claimed is:

1. A copolymerizate foil suitable for surface finishing, and which may be thermosetting, composed of:
(A) an elastomeric copolymerizate with a glass transition temperature no higher than + 10° C., obtained by copolymerizing
   (a) 70 to 99% by weight of an acrylic acid alkyl ester with 1 to 8 carbon atoms in the alkyl residue,
   (b) 1 to 20% by weight of at least one of a hydroxyalkyl ester with 2 to 4 carbon atoms in the alkyl residue, and an acid amide of acrylic or methacrylic acid,
   (c) 0 to 20% by weight of at least one of acrylonitrile and methacrylonitrile, and optionally
   (d) 0 to 2% by weight of a cross-linking monomer with at least two reactive, non-conjugated double bonds in the molecule, the reactivity of the double bonds possibly varying,
where the sum of a, b, c and d amounts to 100% by weight, acting as the grafting base, onto which is grafted
(B) a hard-brittle copolymerizate obtained by copolymerizing (a) 10 to 60% by weight of at least one of styrene and one or more methacrylic acid alkyl esters with 1 to 20 carbon atoms in the alkyl residue,
(b) 1 to 10% by weight of an acrylic acid alkyl ester with 1 to 8 carbon atoms in the alkyl residue,
(c) 0 to 20% by weight of an N-methoxymethyl amide of at least one of acrylic acid and methacrylic acid,
(d) 0 to 20% by weight of a hydroxyalkyl ester of acrylic or methacrylic acid with 2 to 4 carbon atoms in the alkyl residue,
(e) 0 to 20% by weight of acrylic or methacrylic acid amide, the molar ratio of component c to the sum of d and e being about 1 : 1 and that of d : e ranging from 4 : 1 to 1 : 4, and optionally
(f) >20 to 75% by weight of at least one of acrylonitrile and methacrylonitrile, where the sum of components a through f is 100% by weight and where the ratio by weight of the elastomeric copolymerizate A to the hard-brittle copolymerizate B is 1 : 3 to 1 : 20.

2. A process for manufacturing the foil of claim 1, which comprises polymerizing the monomers forming copolymerizate A in emulsion or suspension,
   adding the monomers forming the hard-brittle copolymerizate B to the dispersion of copolymerizate A and in turn polymerizing the latter monomers in emulsion or suspension,
   optionally adding to the dispersion so obtained up to 10% by weight, based upon the copolymerizate, of film-forming enhancing means,
   and producing a foil by pouring the dispersion onto a substrate and evaporating the water.

* * * * *